(12) United States Patent
Kim et al.

(10) Patent No.: US 10,102,404 B2
(45) Date of Patent: Oct. 16, 2018

(54) SECURITY OF SCREEN IN ELECTRONIC DEVICE

(71) Applicant: Samsung Electronics Co., Ltd., Suwon-si, Gyeonggi-do (KR)

(72) Inventors: Hwi Woong Kim, Suwon-si (KR); Dae Hwan Kim, Hwaseong-si (KR); Hyun Ho Kim, Bucheon-si (KR); Go Un Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 14/962,505

(22) Filed: Dec. 8, 2015

(65) Prior Publication Data

US 2016/0180116 A1    Jun. 23, 2016

(30) Foreign Application Priority Data

Dec. 22, 2014 (KR) .................. 10-2014-0186283

(51) Int. Cl.
| | | |
|---|---|---|
| *G06F 21/00* | (2013.01) | |
| *G06F 21/84* | (2013.01) | |
| *G06F 3/0484* | (2013.01) | |
| *G06F 3/0481* | (2013.01) | |
| *H04M 1/67* | (2006.01) | |
| *G09G 5/00* | (2006.01) | |
| *G06F 21/62* | (2013.01) | |
| *G09G 5/14* | (2006.01) | |

(52) U.S. Cl.
CPC ............ *G06F 21/84* (2013.01); *G06F 3/0481* (2013.01); *G06F 3/04847* (2013.01); *G06F 21/6245* (2013.01); *G09G 5/00* (2013.01); *H04M 1/67* (2013.01); *G06F 2203/04804* (2013.01); *G06F 2221/032* (2013.01); *G09G 5/14* (2013.01); *G09G 2320/08* (2013.01); *G09G 2340/10* (2013.01); *G09G 2358/00* (2013.01)

(58) Field of Classification Search
CPC ....................................................... G06F 21/84
USPC .......................................................... 726/34
See application file for complete search history.

(56) References Cited

U.S. PATENT DOCUMENTS

| | | | | |
|---|---|---|---|---|
| 6,262,843 B1 * | 7/2001 | Marx | ...................... | G02B 27/28 109/1 R |
| 7,429,993 B2 * | 9/2008 | Hui | ........................ | G06F 3/0481 345/592 |
| 9,942,260 B2 * | 4/2018 | Milener | .............. | H04L 63/1433 |
| 2005/0210400 A1 | 9/2005 | Hoe-Richardson | | |
| 2008/0025645 A1 * | 1/2008 | Jakobson | ................ | G06F 21/62 382/300 |
| 2009/0009424 A1 * | 1/2009 | Kang | ........................ | H04N 5/45 345/1.3 |
| 2010/0259560 A1 * | 10/2010 | Jakobson | ................ | G06F 21/62 345/629 |

(Continued)

*Primary Examiner* — Harris C Wang
(74) *Attorney, Agent, or Firm* — Jefferson IP Law, LLP

(57) ABSTRACT

An electronic device is provided. The electronic device includes a processor configured to execute an application, and a display configured to display a first window corresponding to the application, wherein, in response to a specified event, the processor is further configured to adjust a transparency of the first window and to output, to a lower layer than a layer of the first window, a second window overlapping at least a part of an area of the first window.

20 Claims, 9 Drawing Sheets

(56) References Cited

U.S. PATENT DOCUMENTS

| | | | |
|---|---|---|---|
| 2010/0275266 A1* | 10/2010 | Jakobson | G06F 3/14 |
| | | | 726/26 |
| 2012/0154435 A1* | 6/2012 | Murakami | G06F 3/14 |
| | | | 345/629 |
| 2014/0176562 A1 | 6/2014 | Somerfield | |
| 2014/0313218 A1 | 10/2014 | Lee et al. | |
| 2015/0067594 A1* | 3/2015 | Choi | G06F 3/0481 |
| | | | 715/808 |
| 2015/0095833 A1* | 4/2015 | Kim | G06F 3/04886 |
| | | | 715/773 |
| 2015/0339090 A1* | 11/2015 | Lee | G06F 3/14 |
| | | | 345/173 |

\* cited by examiner

SECURITY OF SCREEN IN ELECTRONIC DEVICE

CROSS-REFERENCE TO RELATED APPLICATION(S)

This application claims the benefit under 35 U.S.C. § 119(a) of a Korean patent application filed on Dec. 22, 2014 in the Korean Intellectual Property Office and assigned Serial number 10-2014-0186283, the entire disclosure of which is hereby incorporated by reference.

TECHNICAL FIELD

The present disclosure relates to a technology for applying security effects to the contents of a screen output of an electronic device.

BACKGROUND

With the development of a display technology, displays for use in electronic devices have been improved in terms of various factors for improving screen visibility, such as resolution, brightness, a viewing angle, and the like. Not only displays for desktop personal computers (PCs) or note PCs which generally provide at least 10 inch screen but also displays for portable user terminals continue to be improved in terms of a screen size, resolution, brightness, and the like.

As the screen visibility of electronic devices are improved, a user of an electronic device uses a method of dimming a screen of the electronic device or limiting a viewing angle of the screen so as to prevent the screen from being easily recognized by another person. For example, the user attaches a security film to an entire display of the electronic device or limits the viewing angle of the display by hardware.

Hardware-based screen security is applied to an entire display of an electronic device, and may thus restrict flexible use of a screen by a user. Therefore, instead of the hardware-based screen security, software-based screen security is used. According to the software-based screen security, a security image is located at a top layer of an area to which screen security is to be applied so that an effect which is similar to that of a security film or an effect of limiting a viewing angle is brought about.

The hardware-based screen security not only limits the use of a screen as described above, but also requires an additional cost for the hardware and is prone to easy removal of the hardware. In the case of the software-based screen security of the related art, since a security image hides a part of a screen like a security film, content corresponding to an area where the security image is located undergoes security processing en bloc. For example, if a user applies the software-based security of the related art in order to edit an important paper with portable document format (PDF), a security image is generated on an area where a PDF program is displayed so that the area may be dimmed. However, according to this method, even when the user disposes, on the area, a program for which security is not required, such as an Internet browser (e.g., Google maps site) or a Windows explorer, the security image has an effect thereon, so that the user may experience inconvenience in checking information (e.g., map information or the like) of the program for which program is not required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a technology for applying a security effect to a specific application output to a screen of an electronic device if a specified event is detected and for preventing the security effect from being applied to an output area of another application for which security is not required even if the output area of the other application overlaps an output area of the specific application.

In accordance with an aspect of the present disclosure, an electronic device is provided. The electronic device includes a processor configured to execute an application, and a display configured to display a first window corresponding to the application, wherein, in response to a specified event, the processor is further configured to adjust a transparency of the first window and to output, to a lower layer than a layer of the first window, a second window overlapping at least a part of an area of the first window.

In accordance with another aspect of the present disclosure, a method for applying a security effect to an execution screen of an application in an electronic device is provided. The method includes detecting occurrence of a specified event, adjusting a transparency of a first window corresponding to the execution screen if the specified event is detected, generating a second window, and outputting a second window to a lower layer adjacent to a layer of the first window.

In accordance with yet another aspect of the present disclosure, a non-transitory storage medium for storing computer-readable instructions configured to be executed by a processor to perform the above method is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
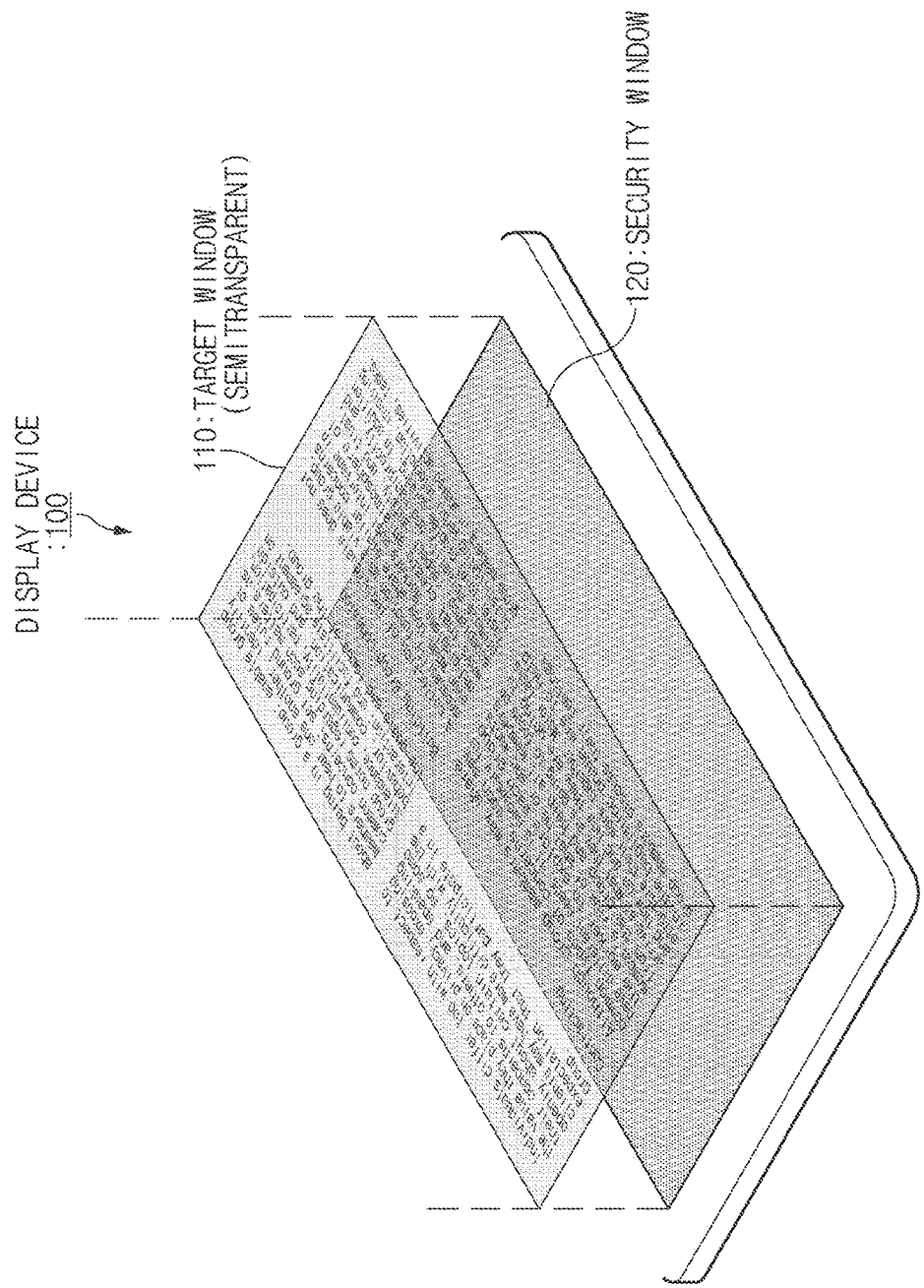
FIG. 1 illustrates an example in which a security effect is applied to a display device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "have", "may have", "include", "may include" or "comprise" used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second" or the like used herein may modify various elements regardless of the order and/or priority thereof, but does not limit the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a central processing unit (CPU) or an application processor (AP)) for executing at least one software program stored in a memory device to perform a corresponding operation.

The terminology used herein is not for delimiting the present disclosure but for describing specific various embodiments of the present disclosure. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates an example in which a security effect is applied to a display device according to an embodiment of the present disclosure.

Referring to FIG. 1, an execution screen of an arbitrary application may be output to a display device 100. The display device 100 may be an element for providing a screen in any electronic device, such as a display of a node personal computer (PC), a monitor of a desktop PC, or the like. However, the display device 100 is not limited to the above-mentioned examples, and may correspond to any other display devices to which various embodiments of the present disclosure described below are applicable. For example, a display of an electronic device capable of outputting an execution screen of an application, such as a tablet, a smartphone, an e-book reader, an infotainment system of a vehicle, or the like, may be construed as the display device 100.

An application, an image, or the like output to the display device 100 may have a sequential layer structure. For example, in the case where a plurality of execution screens of applications are displayed, an execution screen of each application may have an attribute value for determining a priority order of screen output. For example, the attribute value may include a Z-order value for determining a window displayed at an upper level in Windows or various graphical user interfaces (GUIs). For example, if an operating system (OS) of an electronic device is Windows, a window that is constantly displayed at a highest level (e.g., a topmost window) may have an attribute of WS_EX_TOPMOST as an extended attribute. If the OS of the electronic device is not Windows but another OS (e.g., Linux, Android, Tizen, or the like), a window that is constantly displayed at a highest level may have an appropriate attribute corresponding to the above-mentioned topmost window.

FIG. 1 illustrates a situation in which an application is executed on the display device 100 and a security effect is applied to an execution screen of the application. For convenience, FIG. 1 illustrates an example in which one application is executed, and a security effect is applied thereto.

Referring to FIG. 1, a security effect according to an embodiment of the present disclosure may be applied as described below. For example, if a function (Fn) key mounted on a note PC is selected, the security effect may be applied to a currently activated window (i.e., a target window 110). According to an embodiment of the present disclosure, the security effect may be achieved by combining two effects. Firstly, an electronic device (e.g., a processor) renders the target window 110 semitransparent by adjusting a transparency of a layer of the target window 110 which is the execution screen of the application to which the security effect is to be applied. In addition, the electronic device may output a security window 120 to a layer under the target window 110 so that the target window 110 and the security window 120 overlap each other.

For example, in the case where the target window 110 has a transparency of about 50% and the security window 120 is an opaque gray image, the execution screen of the application may appear to be a little bit dark. Accordingly, when the execution screen is viewed in flank, a readability of the execution screen is seriously deteriorated, or, even if the execution screen is viewed at the front thereof, it is difficult for a person other than a user of the electronic device to correctly recognize content output to the execution screen, thereby improving the security effect.

If the transparency of the target window 110 is not adjusted (i.e., the target window 110 remains in an opaque state), even if the security window 120 is disposed as a lower layer of the target window 110, no security effect is brought about since the security window 120 is completely hidden by the target window 110. Furthermore, in the case where only the transparency of the target window 110 is adjusted without disposing the security window 120, a low degree of the security effect may be achieved, but even the user that directly uses the display device 100 may experience serious deterioration of the readability. However, in various embodiments of the present disclosure described below, the security window 120 may be exceptionally omitted by a user setting.

In various embodiments of the present disclosure, the target window 110 and the security window 120 have attributes of adjacent layers (e.g., Z-order). In other words, there is no layer between the layer of the target window 110 and the layer of the security window 120. For example, in the case where the target window 110 has a layer attribute of Z and the security window 120 has a layer attribute of Z+1 (i.e., lower than the target window 110 by one rank), if the layer attribute of the target window 110, among a plurality of windows, is changed (e.g., into Z+k), the layer attribute of the security window 120 may be changed (e.g., into Z+k+1) depending on the layer attribute of the target window 110.

Figure 2:
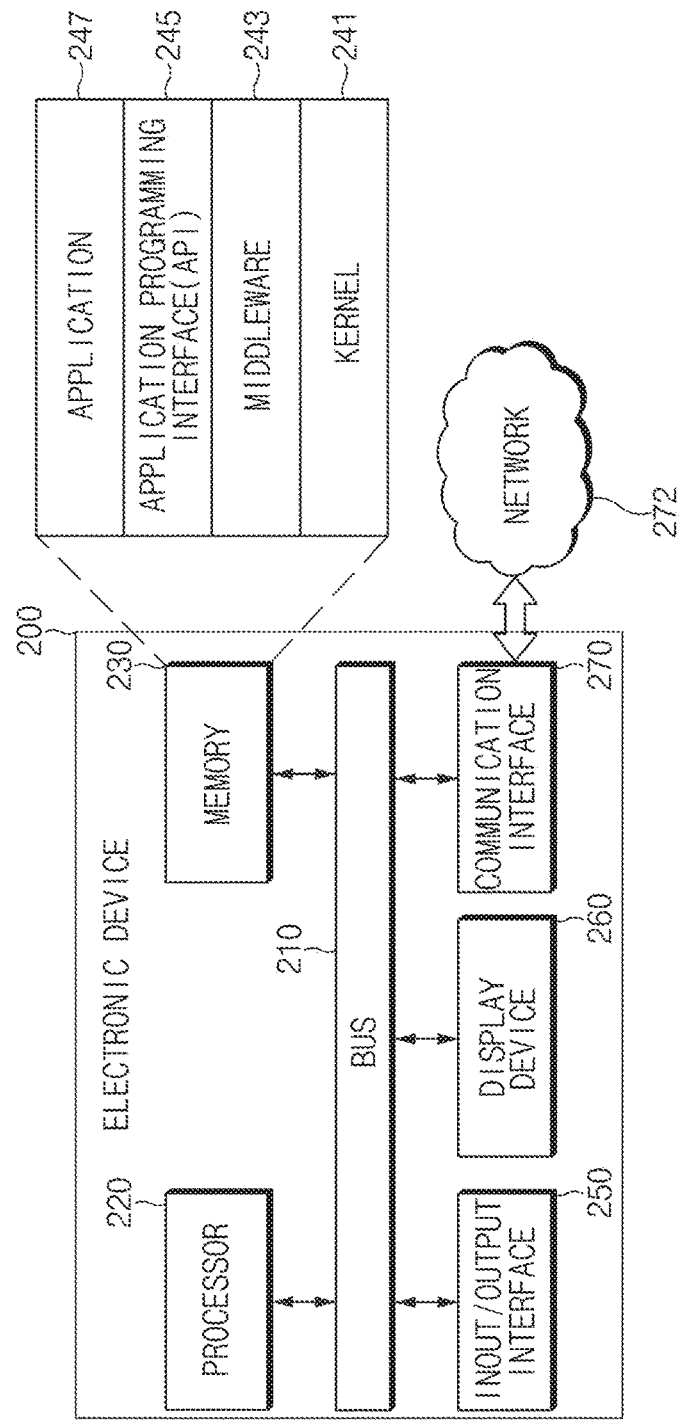
FIG. 2 illustrates an electronic device for implementing a security effect according to an embodiment of the present disclosure.

FIG. 2 illustrates an electronic device for implementing a security effect according to an embodiment of the present disclosure.

Referring to FIG. 2, an electronic device 200 may include a bus 210, a processor 220, a memory 230, an input/output interface 250, a display 260, and a communication interface 270. In various embodiments of the present disclosure, at least one of the foregoing elements may be omitted or another element may be added to the electronic device 200.

The bus 210 may include a circuit for connecting the above-mentioned elements 210 to 270 to each other and transferring communications (e.g., control messages and/or data) among the above-mentioned elements.

The processor 220 may include at least one of a CPU, an AP, or a communication processor (CP). The processor 220 may perform data processing or an operation for communication and/or control of at least one of the other elements of the electronic device 200.

The memory 230 may include a volatile memory and/or a nonvolatile memory. The memory 230 may store instructions or data related to at least one of the other elements of the electronic device 200. According to an embodiment of the present disclosure, the memory 230 may store software and/or a program 240. The program 240 may include, for example, a kernel 241, a middleware 243, an application programming interface (API) 245, and/or an application program (or an application) 247. At least a portion of the kernel 241, the middleware 243, or the API 245 may be referred to as an OS.

In various embodiments of the present disclosure, the application 247 may be executed by the processor 220, and an execution screen of the application 247 may correspond to a window having a relative layer attribute. Furthermore, the processor 220 may generate a security window (e.g., the security window 120) which may correspond to an execution screen of a specific application. In other words, in the case where an event for applying a security effect occurs while the execution screen of the application 247 is displayed, the processor 220 may dispose a window generated by executing a specific application as a lower window of a layer corresponding to the execution screen of the application 247.

The kernel 241 may control or manage system resources (e.g., the bus 210, the processor 220, the memory 230, or the like) used to perform operations or functions of other programs (e.g., the middleware 243, the API 245, or the application program 247). Furthermore, the kernel 241 may provide an interface for allowing the middleware 243, the API 245, or the application program 247 to access individual elements of the electronic device 200 in order to control or manage the system resources.

The middleware 243 may serve as an intermediary so that the API 245 or the application program 247 communicates and exchanges data with the kernel 241.

Furthermore, the middleware 243 may handle one or more task requests received from the application program 247 according to a priority order. For example, the middleware 243 may assign at least one application program 247 a priority for using the system resources (e.g., the bus 210, the processor 220, the memory 230, or the like) of the electronic device 200. For example, the middleware 243 may handle the one or more task requests according to the priority assigned to the at least one application program 247, thereby performing scheduling or load balancing with respect to the one or more task requests.

The API 245 may include at least one interface or function (e.g., an instruction) for file control, window control, image processing, character control, or the like as an interface for allowing the application program 247 to control a function provided by the kernel 241 or the middleware 243.

The input/output interface 250 may serve to transfer an instruction or data input from a user or another external device to (an) other element(s) of the electronic device 200. Furthermore, the input/output interface 250 may output an instruction or data received from (an) other element(s) of the electronic device 200 to the user or another external device.

For example, the input/output interface 250 may receive a user input received via an input device such as a mouse or the like connected to the electronic device 200. In the case where the user makes a specific key input to the mouse or the keyboard, if the key input is intended to generate a security event, the input/output interface 250 may allow a security application request signal (e.g., ScanCode) to be generated and transferred to the processor 220.

The display 260 may include, for example, a liquid crystal display (LCD), a light-emitting diode (LED) display, an organic LED (OLED) display, a microelectromechanical systems (MEMS) display, or an electronic paper display. The display 260 may present various content (e.g., a text, an image, a video, an icon, a symbol, or the like) to the user. The display 260 may include a touchscreen, and may receive a touch, gesture, proximity or hovering input from an electronic pen or a part of a body of the user.

In various embodiments of the present disclosure, the processor 220 may output the execution screen of the application 247 to the display 260. As described above, the processor 220 may determine a relatively upper layer and a relatively lower layer for each execution screen of a plurality of applications or a plurality of execution screens generated by one application (e.g., screens generated by executing Windows explorer or Internet browser multiple times). In the case where the execution screen of the relatively upper layer overlaps the execution screen of the relative lower layer, the execution screen of the lower layer may be hidden by the execution screen of the upper layer.

The communication interface 270, for example, may set communications between the electronic device 200 and an external device. For example, the communication interface 270 may be connected to a network 272 via wireless or wired communications so as to communicate with the external device.

For example, at least one of cellular communication protocols such as long term evolution (LTE), LTE advanced (LTE-A), code division multiple access (CDMA), wideband CDMA (WCDMA), universal mobile telecommunications service (UMTS), wireless broadband (WiBro), global system for mobile communications (GSM), or the like may be used for the wireless communications. The wireless communications may include, for example, short-range communications. The short-range communications may include at least one of Wi-Fi, Bluetooth, near field communication (NFC), global positioning system (GPS), or the like. The wired communications may include at least one of universal serial bus (USB), high definition multimedia interface (HDMI), recommended standard 232 (RS-232), plain old telephone service (POTS), or the like. The network 272 may include at least one of telecommunications networks, for example, a computer network (e.g., a local area network (LAN) or wide area network (WAN)), the Internet, or a telephone network.

Figure 3:
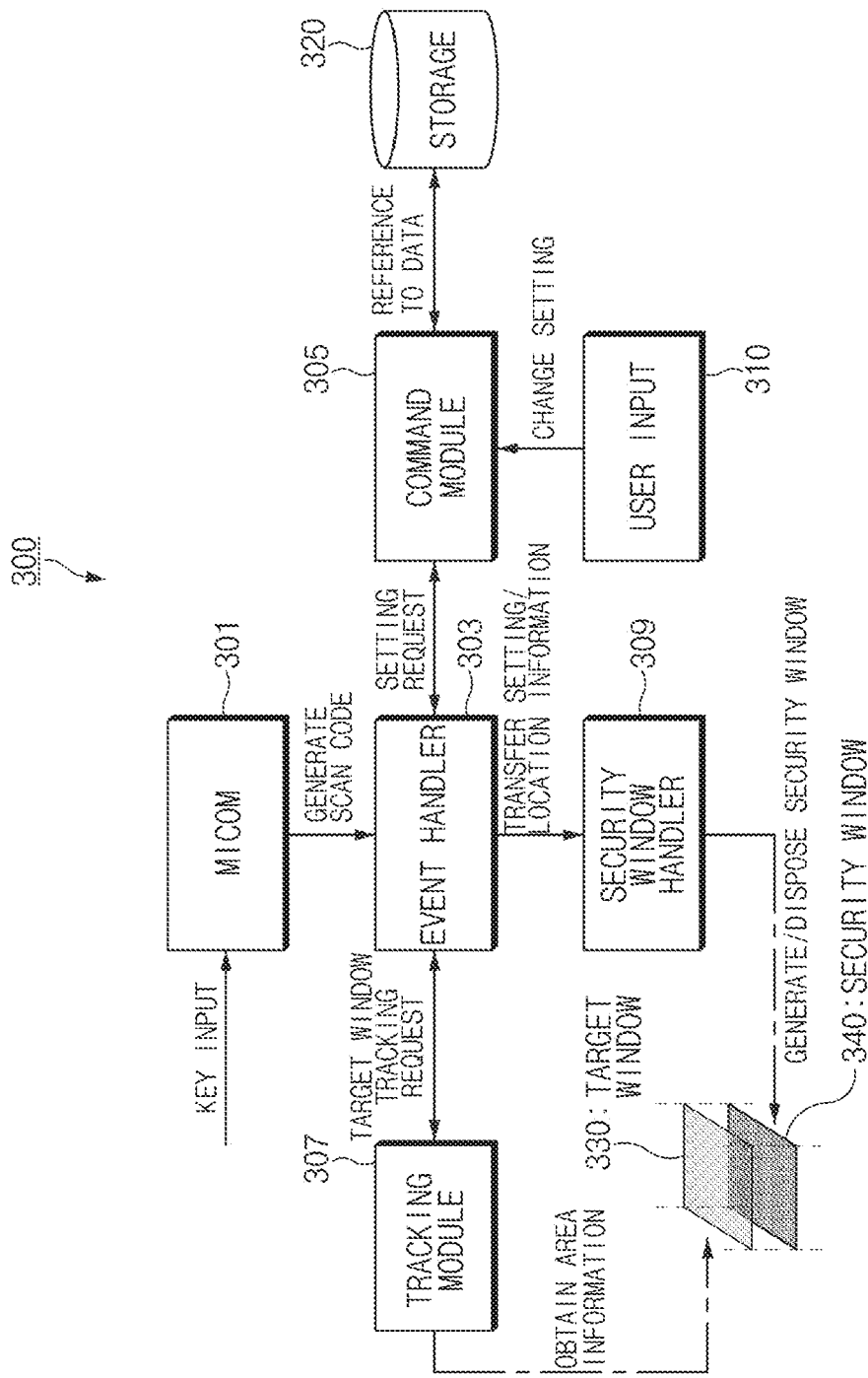
FIG. 3 illustrates a process of implementing a security effect in an electronic device according to an embodiment of the present disclosure.

FIG. 3 illustrates a process of implementing a security effect in an electronic device according to an embodiment of the present disclosure.

Referring to FIG. 3, an electronic device 300 may receive a key input for generating a security event. For example, a micro-computer (MICOM) (e.g., a basic input/output system (BIOS)) of the electronic device 300 may receive a specified key input. FIG. 3 illustrates a key input, but the security event may occur in various ways. For example, if an additional security program is executed, the security event may occur in response to an input to a GUI related to the security program. In the case where the electronic device 300 supports a touch input to a display, a security event may occur if a touch input occurs on a specified area of a display (e.g., the display 260) or a touch input of a specified type (e.g., a triple touch, a palm touch, a multi-touch, a three-point touch, or the like) occurs.

In various embodiments of the present disclosure, the security event may represent an event recognized via a sensor provided to the electronic device 300. For example, the electronic device 300 may be provided with a fingerprint sensor or various types of biometric sensors. If specified sensor information (or sensor information equal to or larger than a threshold value) is detected from a user, for example, if a user fingerprint is recognized by a fingerprint sensor, when a specific application is executed, the electronic device 300 may induce the security event so that the security effect is applied to an execution screen of the specific application.

If a MICOM 301 recognizes a security event such as a specified key input, the MICOM 301 may generate a message (e.g., ScanCode) recognizable by an event handler 303 and may provide the message to the event handler 303. Upon receiving the message, the event handler 303 may request a command module 305 to send information for generating a security window 340 and may request a tracking module 307 to obtain information on a target window 330. If the event handler 303 obtains the requested information from the tracking module 307 and the command module 305, the event handler 303 may transfer, to a security window handler 309, information related to a setting of the security window 340 and location information of the target window 330.

If the command module 305 receives a request for setting information of the security window 340 from the event handler 303, the command module 305 may refer to data stored in a storage 320 and may provide the setting information of the security window 340 to the event handler 303. For example, the command module 305 may provide an image pattern, transparency (or opacity), or the like of the security window 340 to the event handler 303.

Furthermore, the command module 305 may change a security setting based on a user input 310, and may store the changed setting in the storage 320. For example, the user may set an attribute of the security window 340 via a GUI (e.g., a configuration screen related to a security program) provided to the display of the electronic device 300. If the attribute of the security window 340 is changed by the user input 310, the command module 305 may store changed attribute information in the storage 320. An example of changing a setting by the user will be described with reference to FIG. 6.

In various embodiments of the present disclosure, the attribute of the security window 340 may be adjusted in real time by the predefined user input 310 (e.g., a specified key input or the like). In this case, if the command module 305 obtains the predefined user input 310, the command module 305 may provide, to the event handler 303, information (signal) related to the user input 310. The event handler 303 may allow the security window handler 309 to change the attribute of the security window 340 based on the user input 310. The attribute of the security window 340 changed in this manner may be temporary and may not be stored in the storage 320. In other words, in the case where the security effect is applied again after being released, the electronic device 300 may generate the security window 340 based on the security setting previously stored in the storage 320 without considering the predefined user input 310.

The tracking module 307 may obtain area information of the target window 330. The area information may correspond to, for example, coordinates of the target window 330 (e.g., x and y coordinates of a top left corner) and a size thereof (e.g., a width and a height of the target window 330). Alternatively, the area information may correspond to coordinates of four corners of the target window 330. The above-mentioned area information is merely an example, and may correspond to, in various embodiments of the present disclosure, information for determining an output area of a window on an OS for driving the electronic device 300.

The security window handler 309 may generate the security window 340 based on the setting information received from the event handler 303, and may dispose the security window 340 at a lower layer adjacent to a layer of the target window 330 based on the area information of the target window 330 obtained by the tracking module 307.

The various modules, handlers, etc. illustrated in FIG. 3 are classified according to functions for convenience, and a plurality of elements may be integrated into one element. For example, the functions performed by the event handler 303, the security window handler 309, and the tracking module 307 may be integrated so as to be performed by the event handler 303. In various embodiments of the present disclosure, the electronic device 300 may be provided with a processor for performing the functions of the event handler 303, the command module 305, the tracking module 307, and the security window handler 309. For example, the processor may execute an application and may output an execution screen (e.g., a first window) as the target window 330 to the display, and, if a specified event such as the above-mentioned key input occurs, the processor may adjust the transparency of the execution screen (e.g., render the execution screen semitransparent) and may output a security image (e.g., a second window) to a lower layer than a layer of the execution screen. The execution screen and the security image may be output to exactly the same area. However, in various embodiments of the present disclosure, the security image and the execution screen, i.e., the security window 340 and the target window 330, are not required to exactly match each other in terms of output areas thereof, and thus it may be enough that the output area of the security window 340 overlaps at least a part of the area of the target window 330 so that a security effect is achieved.

Figure 4:
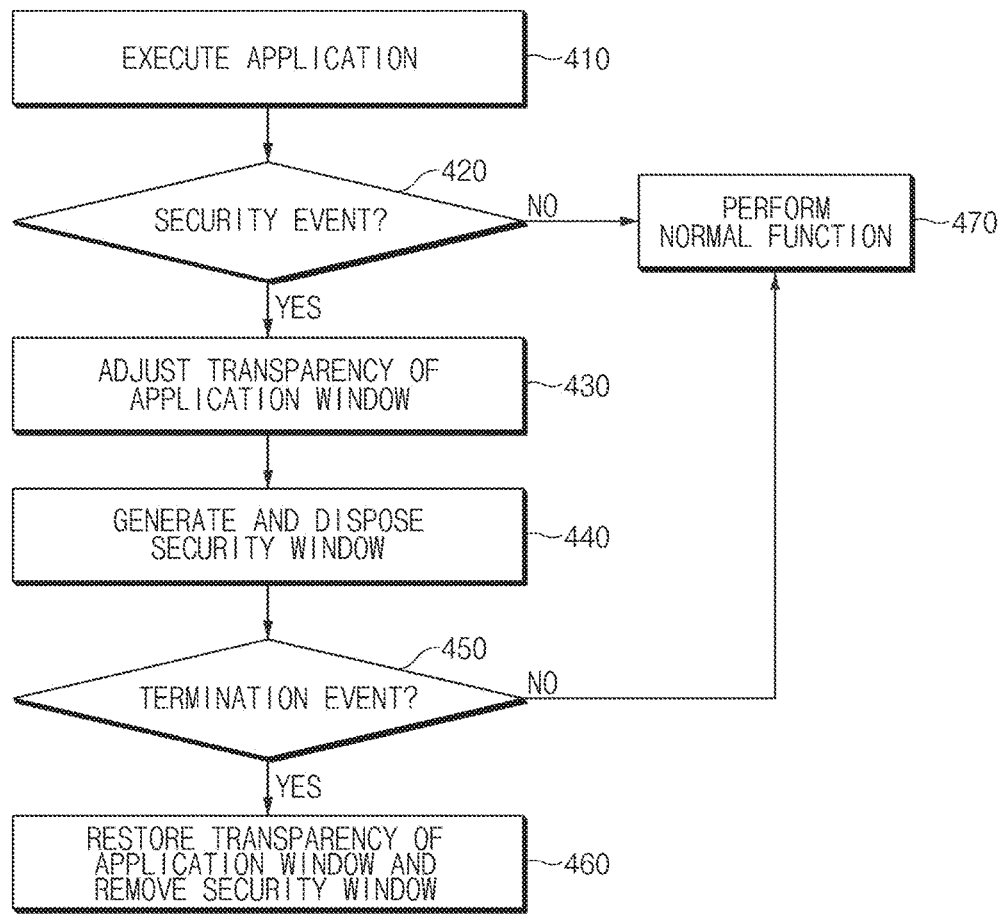
FIG. 4 illustrates a process of applying and releasing a security effect in an electronic device according to an embodiment of the present disclosure.

FIG. 4 illustrates a process of applying and releasing a security effect in an electronic device according to an embodiment of the present disclosure. The process illustrated in FIG. 4 may be performed by the electronic device 200 of FIG. 2 or the electronic device 300 of FIG. 3. For convenience, the following description is provided with respect to the electronic device 200. Descriptions that are similar to, correspond to or overlap with the above descriptions may not be provided below.

Referring to FIG. 4, in operation 410, the processor 220 of the electronic device 200 may execute an application. For example, the application 247 stored in the memory 230 may be executed. The executed application may be output to a partial area of the display 260 of the electronic device 200. Hereinafter, for convenience, a window corresponding to an execution screen of an application is referred to as a first window, and an output area of the first window is referred to as a first area.

In operation 420, the processor 220 may determine whether an event that occurs on the input/output interface 250 or various sensors is a specified security event. For example, the specified security event may be the above-mentioned specific key input or specified sensor information. Furthermore, in various embodiments of the present disclosure, the security event may correspond to execution of a specific application. For example, the memory 230 may store a list of applications for which security is required. If execution of any one of the applications of the list is detected, the processor 220 may execute a security program (e.g., execute in the background, or execute or activate a security service) so that the security effect is applied to the executed application.

If it is determined that the event that has occurred is not the security event in operation 420, the processor 220 may perform a normal function corresponding to a corresponding event in operation 470. If it is determined that the event that has occurred is the security event in operation 420, the processor 220 may perform operation 430 and the following operations.

In operation 430, the processor 220 may adjust the transparency of the first window, i.e., the window of the application. In general, an application has an opaque window, and, if another application is disposed thereon, a part of the window of the application overlapped by the other application is hidden and invisible. In operation 430, the processor 220 may adjust the transparency of the first window from an opaque state to a semitransparent state so that the first window is superimposed on another window disposed under the first window.

In operation 440, the processor 220 may generate and dispose a security window (e.g., a second window). For example, the processor 220 may obtain the setting information of the security information from the memory 230 (or the storage 320), and may determine an image or an image pattern corresponding to the security window and the transparency (e.g., 20% transparency, 0% transparency (i.e., opaque), or the like) of the security window. Furthermore, the processor 220 may obtain information on an output area of the execution screen, i.e., information on the first area, and may determine an output area of the security window based on the obtained information. For example, the first window (application window) and the second window (security window) may have the same size and may be output to the same area. In another example, the second window may overlap a part of the area of the first window. If the second window is generated as described above, the processor 220 may dispose the security window at a lower layer of the first window. Therefore, since the first window and the second window are displayed while overlapping each other partially or entirely, the execution screen of the application may be dimmed or blurred to a certain degree, thereby reducing a distance from which the execution screen is recognizable. The distance from which this screen is recognizable may be appropriately set so as to be suitable for the user that directly uses the electronic device 200.

Furthermore, since the security window is disposed at the lower layer of the first window, any other application is not affected by the security window even if it is displayed over the first window. Therefore, the security effect may be prevented from being applied to other applications irrelevant to the security effect.

Furthermore, in various embodiments of the present disclosure, a location of the first window may be changed. For example, the first window may be moved to any portion of the display 260 or may be minimized or maximized. Even in this case, the security window may be disposed depending on a change in the screen of the first window. This point will be described in detail with reference to FIGS. 5A and 5B.

In operation 450, the processor 220 may determine whether an event for terminating (or releasing) the security effect is detected. If a detected event is not intended to terminate the security effect, the processor 220 may perform a normal function corresponding to the detected event.

If the event for terminating the security effect is detected in operation 450, the processor 220 may remove the security window and may restore an original transparency (e.g., opaque state) of the first window in operation 460.

Figure 5A:
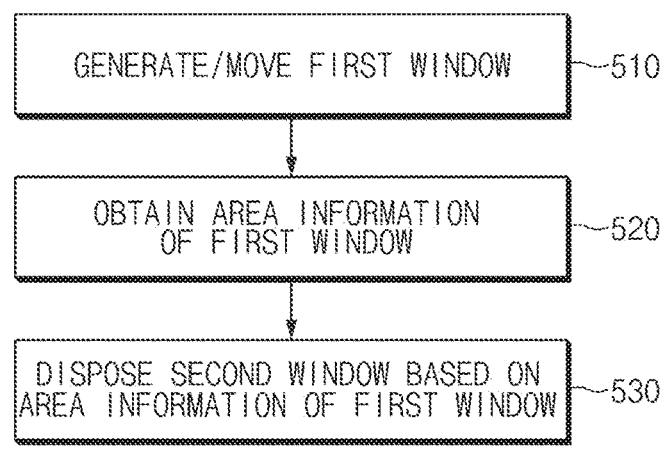
FIG. 5A illustrates a method of disposing a security window depending on a location change of a target window according to an embodiment of the present disclosure.
Figure 5B:
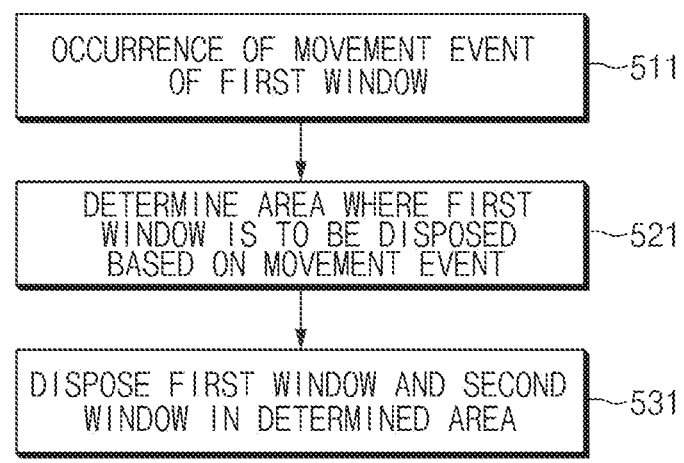
FIG. 5B illustrates another method of disposing a security window depending on a location change of a target window according to an embodiment of the present disclosure.

FIG. 5A illustrates a method of disposing a security window depending on a location change of a target window according to an embodiment of the present disclosure. FIG. 5B illustrates another method of disposing a security window depending on a location change of a target window according to an embodiment of the present disclosure. A target window or an application window is referred to as a first window, and a security window is referred to as a second window below.

Referring to FIG. 5A, in operation 510, the first window may be (generated and) moved. Here, the movement of the first window represents not only that the first window is moved while maintaining the same size, but also that a size of the first window is changed. In other words, any input that induces a change in an output area of the first window may correspond to the movement described in FIG. 5A or 5B. For example, by manipulating a mouse or a keyboard of the user or making a touch input, the output area of the first window may be changed (or moved).

In operation 520, the processor 220 may obtain the area information of the first window. For example, the processor 220 may obtain the area information of the first window continuously or periodically during the movement and while the security effect is applied to the first window.

In operation 530, the processor 220 may determine an area in which the second window is to be disposed, based on the area information obtained in operation 520, and then dispose second window accordingly. Through the process of FIG. 5A, the security effect may be continuously maintained regardless of the movement of the first window.

FIG. 5B illustrates another method of disposing a security window depending on a location change of a target window according to an embodiment of the present disclosure.

Referring to FIG. 5B, in operation 511, an event for moving the first window may occur. For example, if a user input for changing the output area of the first window occurs, the processor 220 may determine an area in which the first window is to be located based on the user input in operation 521.

In operation 531, the processor 220 may dispose the first window and the second window based on the area determined in operation 521. In other words, in the case where the user input induces a change in an output area of the first window from a first area to a second area, the processor 220 may output the first window to the second area, and, at the same time, may change a location of the second window based on a correspondence relationship between the first area and the second area. If the second window has been being disposed at the same area as the first window, the second window may be output to the second area. If the second window has been being disposed at a part of the area of the first window, the second window may be output to a part of the second area according to the correspondence relationship.

Figure 6:
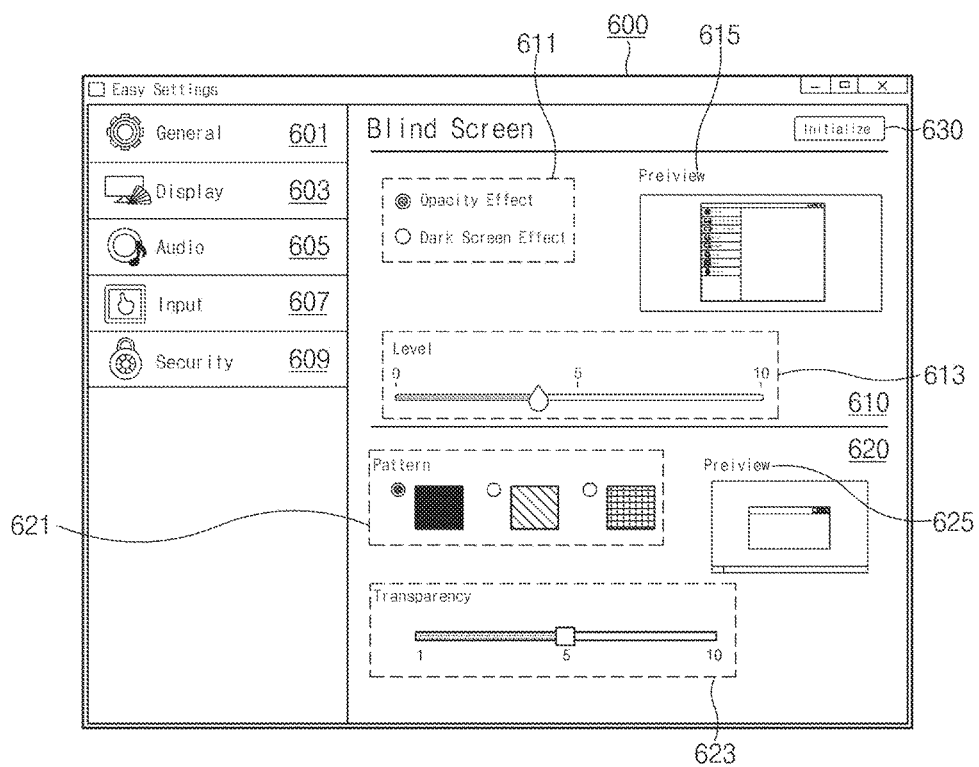
FIG. 6 illustrates an example in which a security effect is set according to an embodiment of the present disclosure.

FIG. 6 illustrates an example in which a security effect is set according to an embodiment of the present disclosure.

Referring to FIG. 6, the screen 600 is a screen for setting an effect applied to a security window of the present disclosure. The screen 600 may be, for example, a security setting screen of an OS or a setting screen of a security program for implementing a security effect. For example, the screen 600 may correspond to a screen to which the user input 310 of FIG. 3 may be provided.

The screen 600 may include setting menus for various items. For example, the screen 600 may include a general setting 601, a display setting 603, an audio setting 605, an input setting 607, a security setting 609, or the like. However, such setting menus are merely exemplary and may be variously modified.

If the security setting 609 is selected, a screen for implementing the security effect may be provided. For example, a screen 610 may provide menus for changing a setting of a target window, and a screen 620 may provide menus for changing a setting of a security window. The screen 610 and the screen 620 may be provided to individual screens, or may be provided together to the same screen.

The screen 610 may provide a menu 611 for determining the type of the security effect to be applied to the target window. For example, if an item of "Opacity Effect" is selected, the security effect in which the security window is not disposed and only the transparency (or opacity) of the target window is adjusted may be applied. If an item of "Dark Screen Effect" is selected, the security effect in which the security window is used and the transparency of the target window is also adjusted may be applied. The illustrated items are merely exemplary and may be variously modified.

Furthermore, a menu 613 for adjusting the transparency of the target window may be provided. Moreover, a preview 615 of an effect determined by the menu 611 and the menu 613 may be provided.

The screen 620 may provide a menu 621 for determining an image pattern to be applied to the security window. For example, the user may apply an image pattern such as a monochromatic pattern, a diagonal line pattern, a lattice pattern, or the like to the security window. Such patterns are merely exemplary, and there may be additional various security image patterns.

Furthermore, a menu 623 for determining the transparency of the security window may be provided. In the case where an execution screen of another application is disposed at a lower layer than that of the security window, the security window may be set to be opaque in order to avoid serious obstruction of screen recognition caused by overlapping at least three layers such as target window-security window-window of another application. However, in various embodiments of the present disclosure, the security window may be set to be semitransparent so as to provide the security effect and also allow a user of an electronic device to properly recognize a screen when the security window is displayed while being overlapped by the target window of which the transparency is adjusted. Moreover, a preview 625 of an effect determined by the menu 621 and the menu 623 may be provided.

The screen 600 may provide an initialization menu 630 for initializing the security effect changed by the user. If the initialization menu 630 is selected, the processor 220 may provide a default security effect. For example, the processor 220 may decrease the transparency of the target widow to about 50%, and may allow the security window of an opaque black image to be output as a lower layer to the same area as the target window.

In various embodiments of the present disclosure, the security effect may be applied to two or more windows. For example, if the security effect is applied to a second window when the security effect is already applied to a first window, a security event may occur. In this case, the processor 220 may apply, to the second window, the same security effect as that applied to the first window, or may release the security effect of the first window and may newly apply the security effect to the second window.

Figure 7:
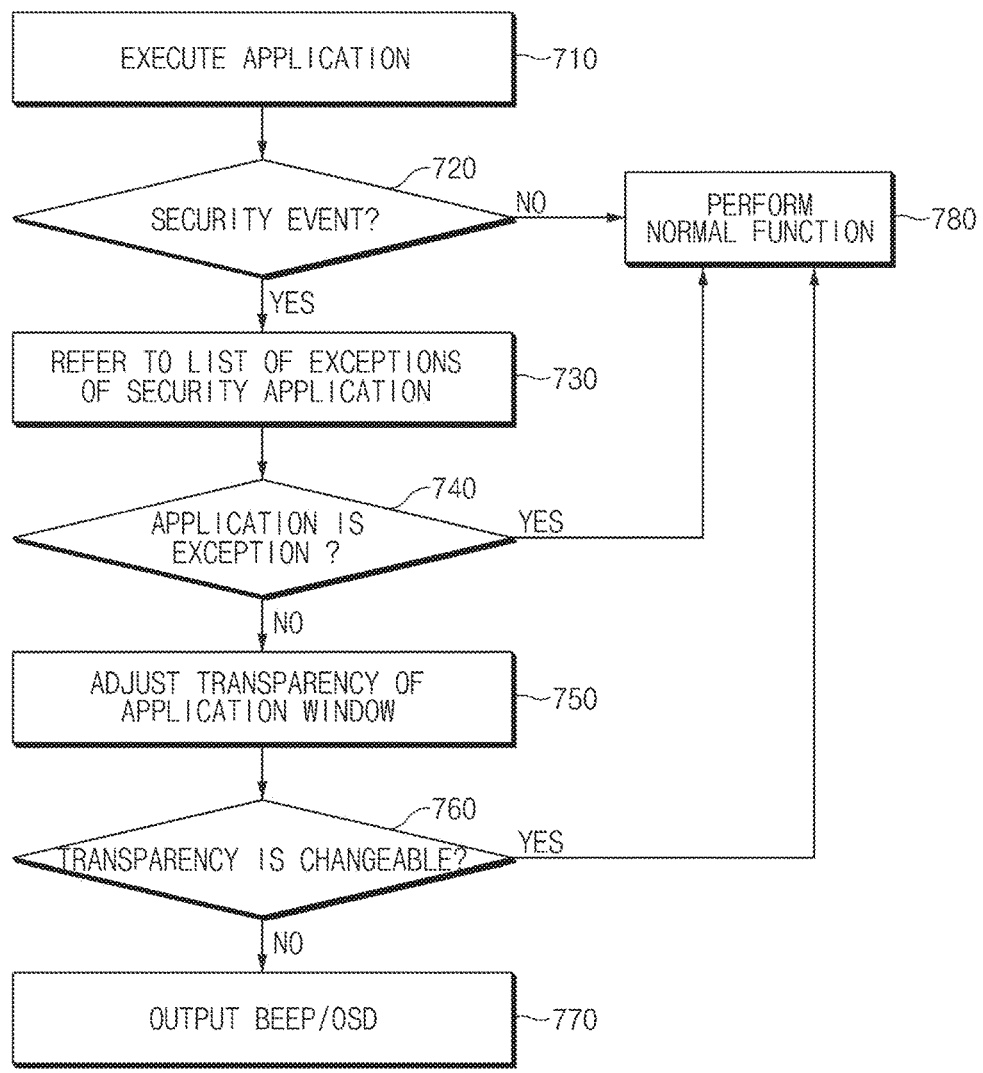
FIG. 7 illustrates a process of exceptionally handling application of a security effect according to an embodiment of the present disclosure.

FIG. 7 illustrates a process of exceptionally handling application of a security effect according to an embodiment of the present disclosure.

Due to various limitations caused by hardware or software of an electronic device, the transparency of the target window may be unable to be set, or malfunction may occur when the transparency is set. For example, in the case where a setting value of the transparency is not applied to the target window after the transparency is set, or it is determined that the security effect is unable to be applied or the application of the security effect is inappropriate based on a process name of a window, a window title, or a class of a window, the electronic device may except such a window from a subject of application of the security effect.

Referring to FIG. 7, if an application is executed in operation 710, the electronic device may determine whether a security event occurs in operation 720. If it is determined that the security event occurs, the electronic device may not immediately adjust the transparency of an application window, but the processor 220 may query whether the application is an exception from a subject of application of the security effect in operation 730. If it is determined that the application to which the security effect is currently intended to be applied is an exception from a subject of application of the security effect in operation 740, the processor 220 may perform a normal function without applying the security effect in operation 780.

If it is determined that the application is not the exception in operation 740, the processor 220 may attempt to adjust the transparency of the application window in operation 750. However, if it is determined that the transparency of the application window is unable to be adjusted or an error may occur due to adjustment of the transparency in operation 760, the process may proceed to operation 770 so that the electronic device may output a guide message to an on screen display (OSD) or may generate a beep sound. If the transparency is adjustable, in operation 760, the processor 220 may perform a normal function of operation 780, i.e., may change the transparency and may generate and apply the security window.

Figure 8:
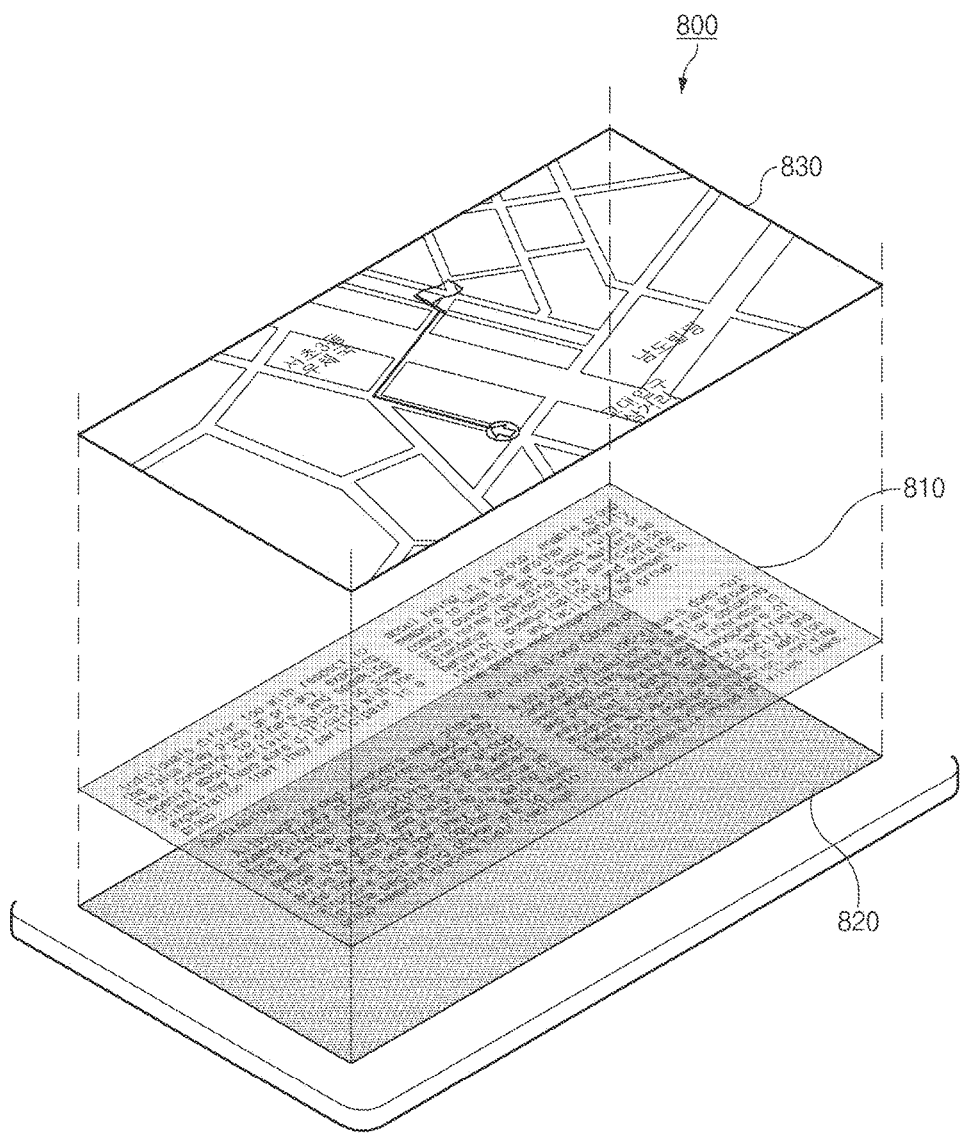
FIG. 8 illustrates another example in which a security effect is applied to a display device according to an embodiment of the present disclosure.

FIG. 8 illustrates another example in which a security effect is applied to a display device according to an embodiment of the present disclosure. The example of FIG. 8 is similar to that of FIG. 1, but, in the example of FIG. 8, a window 830 of an application to which the security effect is not applied is disposed as an upper layer of a target window 810.

Referring to FIG. 8, the display device 800 may be construed as a display device to which various embodiments of the present discourse are applicable, like the display device 100 of FIG. 1, or the display device 200 of FIG. 2. As illustrated in FIG. 8, a security window 820 is disposed as a lower layer of the target window 810 set to be semitransparent. Therefore, even if the other window 830 is disposed at the upper layer of the target window 810, a hindrance to screen recognition of a user caused by unintentional application of the security effect does not occur. Furthermore, since the security window is disposed as the lower layer of the target window 810, a user input to the corresponding area is applied to the target window 810 but is not applied to the security window.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a non-transitory computer-readable storage medium in the form of a program module.

For example, a storage medium may store computer-readable instructions configured to perform, when being executed by a processor, outputting an execution screen of an application to a display, detecting occurrence of a specified event, adjusting a transparency of the execution screen if the specified event is detected, generating a security window, and outputting the security window to a lower layer adjacent to a layer of the execution screen.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, a software-based security effect may be applied to a display of an electronic device, and, at the same time, the security effect may be prevented from being unintentionally applied to another application that is not a subject of application of the security effect.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a processor configured to execute an application; and
   a display configured to display a first window corresponding to the application,
   wherein the processor is further configured to:
      in response to a specified event, adjust a transparency of the first window, and
      in response to the specified event, generate a second window and output, to a lower layer adjacent to a layer of the first window, the generated second window such that the first window overlaps at least a part of an area of the second window, and
   wherein the first window and the second window have attributes of adjacent layers such that, if a layer attribute of the first window, among a plurality of windows, is changed, a layer attribute of the second window is changed based on the layer attribute of the first window.

2. The electronic device of claim 1, wherein, the application is a pre-defined application for which security is required, and the specified event corresponds to an execution of the pre-defined application.

3. The electronic device of claim 1, wherein the specified event corresponds to an input of a specific key via an input device of the electronic device.

4. The electronic device of claim 1, wherein, if the area of the first window is changed, the processor is further configured to:
obtain area information of the first window changed, and
change an area of the second window based on the obtained area information.

5. The electronic device of claim 1, wherein, if an input for moving the first window or changing a size of the first window is received, the processor is further configured to apply the input to the second window.

6. The electronic device of claim 1, wherein the processor is further configured to not output the second window when the application is terminated.

7. The electronic device of claim 1, wherein the processor is further configured to:
obtain a security setting stored in a memory, and
adjust the transparency of the first window and generate the second window, based on the security setting.

8. The electronic device of claim 7, wherein the security setting comprises transparency information of the first window.

9. The electronic device of claim 7, wherein the security setting comprises at least one of a color, a pattern, or a transparency of the second window.

10. The electronic device of claim 7, wherein the processor is further configured to:
receive an input for changing information on at least one item included in the security setting via a setting program, and
store a changed security setting in the memory.

11. The electronic device of claim 1, wherein, if an input to an area in which the first window overlaps the second window occurs, the processor is further configured to handle the input as an input to the application.

12. The electronic device of claim 1, wherein the processor is further configured to not dispose another layer between the layer of the first window and the layer of the second window.

13. A method for applying a security effect to an execution screen of an application in an electronic device, the method comprising:
detecting an occurrence of a specified event;
in response to the specified event, adjusting a transparency of a first window corresponding to the execution screen; and
in response to the specified event, generating a second window and outputting the second window to a lower layer adjacent to a layer of the first window,
wherein the first window and the second window have attributes of adjacent layers such that, if a layer attribute of the first window, among a plurality of windows, is changed, a layer attribute of the second window is changed based on the layer attribute of the first window.

14. The method of claim 13, wherein the generating the second window comprises:
obtaining information on an output area of the first window; and
obtaining setting information of the second window,
wherein the second window is generated based on the information on the output area and the setting information.

15. The method of claim 13, wherein the second window is output such that the first window overlaps at least a part of an output area of the second window.

16. The method of claim 13, further comprising:
receiving an input for changing a setting of the output second window; and
changing the setting of the output second window based on the input,
wherein the setting comprises at least one of a transparency, an image pattern, or a color of the second window.

17. The method of claim 13, comprising:
receiving an input for changing a setting of the first window; and
changing the transparency of the first window based on the input.

18. The method of claim 13, comprising:
detecting a change in an area to which the first window is output; and
outputting the second window based on the change in the area.

19. The method of claim 13, comprising:
obtaining an input for changing an area to which the first window is output;
outputting the first window to a changed area based on the input; and
changing an area to which the second window is output based on the input.

20. A non-transitory storage medium for storing computer-readable instructions configured to be executed by a processor to perform a method, the method comprising:
outputting, to a display, a first window corresponding to an execution screen of an application;
detecting an occurrence of a specified event;
in response to the specified event, adjusting a transparency of the first window; and
in response to the specified event, generating a second window and outputting the second window to a lower layer adjacent to a layer of the first window,
wherein the first window and the second window have attributes of adjacent layers such that, if a layer attribute of the first window, among a plurality of windows, is changed, a layer attribute of the second window is changed based on the layer attribute of the first window.

* * * * *